United States Patent [19]

Ordeman

[11] Patent Number: 4,838,239
[45] Date of Patent: Jun. 13, 1989

[54] LOCKABLE MOUNTING FOR RETAINING A REMOVABLE ITEM TO A BASE

[76] Inventor: John Ordeman, 35 Tendring Way, Girrawheen, Western Australia, Australia

[21] Appl. No.: 828,321
[22] PCT Filed: Apr. 24, 1985
[86] PCT No.: PCT/AU85/00095
 § 371 Date: Mar. 14, 1986
 § 102(e) Date: Mar. 14, 1986
[87] PCT Pub. No.: WO85/04792
 PCT Pub. Date: Nov. 7, 1985

[30] Foreign Application Priority Data

Apr. 26, 1984 [AU] Australia .................... PG4709

[51] Int. Cl.⁴ .................... F24C 3/00; F16G 11/00
[52] U.S. Cl. .................... 126/39 R; 126/390; 126/24; 219/432; 206/477; 206/482; 248/298; 248/117.2; 24/305; 24/132 AA
[58] Field of Search .................... 126/39 R, 39 C, 42, 126/373, 390, 266, 260, 240, 24, 81, 211, 218, 284; 219/443, 432, 433, 429, 438; 24/305, 132 R, 132 AA, 519; 248/117.2, 298, 127, 346.1; 206/477, 482

[56] References Cited

U.S. PATENT DOCUMENTS

| 1,749,239 | 3/1930 | Abel | 126/390 |
| 2,878,803 | 3/1959 | Del Papa | 126/24 |
| 3,372,688 | 3/1968 | Moore | 126/24 |
| 4,313,050 | 1/1982 | Abenaim | 126/24 X |
| 4,399,351 | 8/1983 | Koff | 219/432 X |

FOREIGN PATENT DOCUMENTS

| 291779 | 7/1953 | Fed. Rep. of Germany . |
| 1114786 | 5/1968 | United Kingdom . |
| 1276726 | 7/1972 | United Kingdom . |

Primary Examiner—Larry Jones
Attorney, Agent, or Firm—Harness, Dickey & Pierce

[57] ABSTRACT

A mounting for retaining item (12) to a base (17) comprising a male and female element (11 and 15) to be located on the moveable item (12) or base (17) respectively or vice versa. Said male portion (11) having a disc like configuration and having at least one flange like protrusion (18) at one face thereof and to one side thereof which is spaced from the other face. Said female portion 15 having an aperature (16) at one face thereof which is of corresponding configuration and dimensions as the male member (11) at the other face.

7 Claims, 2 Drawing Sheets

LOCKABLE MOUNTING FOR RETAINING A REMOVABLE ITEM TO A BASE

This INVENTION relates to a means for lockably retaining a removable member to a base.

In one form the invention resides in a lockable mounting for retaining a movable item to a base comprising a male and female element to be supported by the removable item and base respectively or vice versa, said male portion having a disc like configuration and the female portion formed with an aperture of corresponding configuration wherein the outer most portion of the aperture is of reduced dimensions, said male portion being formed at one side with at least one lateral protrusion at its outer most face.

According to a preferred feature of the invention said base comprises the cooking surface or a stove.

The invention will be more fully understood in the light of the following description of one specific embodiment. The description is made with reference to the accompanying drawings of which:

Figure 1:
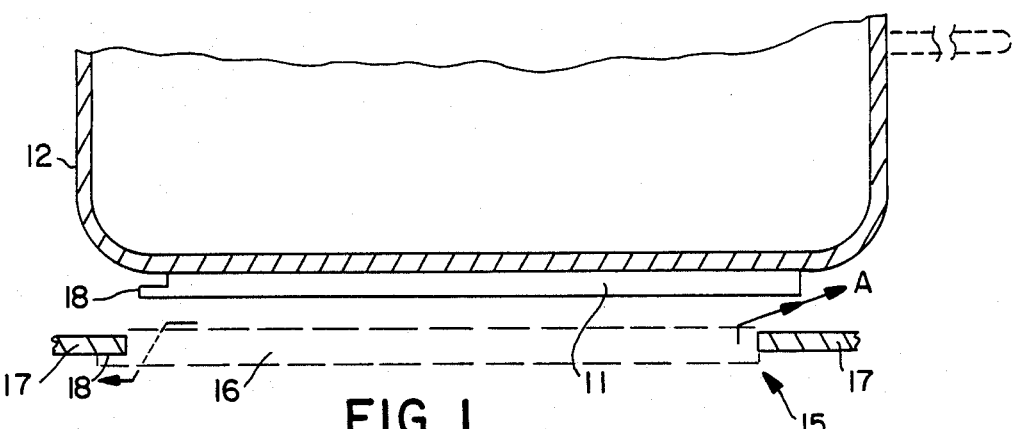
FIG. 1 is a schematic sectional elevation showing a removable item associated with the locking means of the embodiment.

The embodiment is directed towards a locking means which has particular application for retaining cooking utensils such as saucepans, pans and the like on the cooking surface of the stove. It is well known that the kitchen is one of the most dangerous localities in a house and in particular the stove area which when in use supports a number of different pots and pans each containing hot contents and each of which may be readily tipped over if mis-handled. This danger is particularly great where young children are present who cannot see what is in the saucepan and who as a result of their curiosity may pull the handle of the saucepan causing its contents to be tipped on them. Many children are seriously injured or killed as a result of such incidents.

It is an object of the embodiment to provide a means of retaining such pots and pans on the cooking surface to prevent accidental dislodgement and yet facilitate ready removable of such pots and pans when desired.

The embodiment comprises a locking means consisting of two elements, the first element is to be applied to the underneath of a pan or saucepan or may be formed integrally therewith. The first element comprises a pair of circular discs of equivalent dimension wherein a first disc 13 is bonded or otherwise affixed to the underneath of a pan and the second disc 14 is bonded or otherwise fixed to the first disc but is displaced slightly off centre from the first disc such that a portion of the second disc extends beyond the perimeter of the first disc 13 to define a flange 18 spaced from the base of the utensil 12. If desired the first element 11 may be formed integrally into the base of the pan and if desired the first and second discs 13 and 14 may be formed integrally.

The second element 15 of the embodiment is to be mounted over the cooking zone whether it be an electric hotplate or ring or a gas burner, and comprises an aperture 16 formed in a support 17 having a configuration corresponding to the configuration of the first and second disc 13 and 14. The thickness of the support 17 is less than or equal to the thickness of the first disc 13 or spacing of the flange formed by the second disc 14 from the underneath of the cooking utensil 12.

Figure 2:
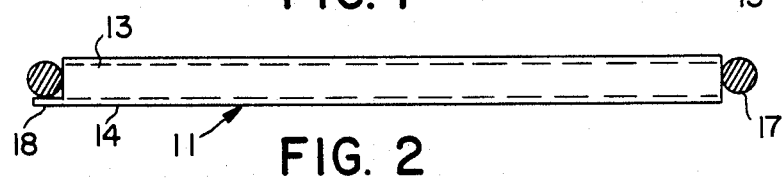
FIG. 2 illustrates an alternative form of locking means.

As shown at FIG. 1 the support 17 may comprise a planar surface or as shown at FIG. 2 may comprise a ring.

In use the first element is located on the base of a saucepan integrally or otherwise such that the flange is remote from the handle of the saucepan (as shown in phantom in FIG. 1). To locate a saucepan onto the base the saucepan is tipped slightly such that the flange formed by the second disc 14 is lowermost in order that the flange can be inserted underneath the support 17 to allow the remainder of the first element 11 to be located in the aperture 16. Once in position the pan cannot be accidently tipped by downward pressure on the handle which is the most likely event where young children are present. In addition the saucepan cannot be displaced laterally from its position on the stove unless one side of the saucepan remote from the flange is lifted slightly and the pan is moved obliquely upwardly away from the support 17 as shown by the arrow A of FIG. 1.

Where the aperture in the second element is circular the saucepan can be rotated about a vertical axis without the locking elements becoming dislodged.

It should be appreciated that the degree by which the second disc may be mounted off centre from the first disc can be varied according to the circumstances in which the element is to be used. In addition the first element may be located in association with the working zone and the second element mounted to the cooking utensil.

Figure 3:
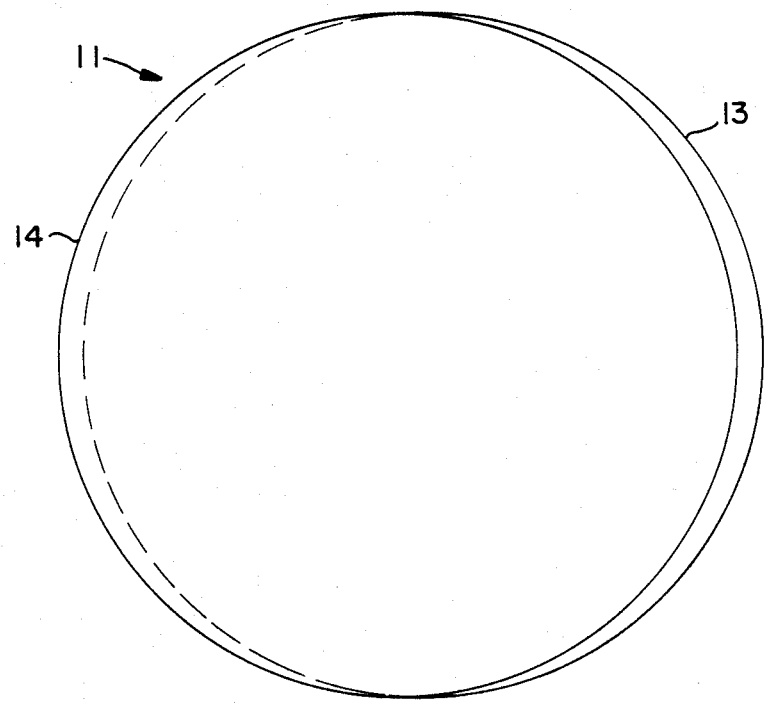
FIG. 3 is an underneath view of a first element of the locking means.
Figure 4A:
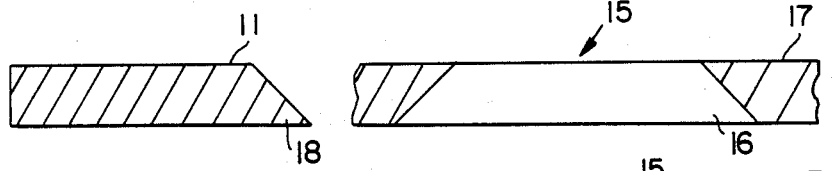
FIG. 4 illustrates a number of variations of configuration of the elements of the locking means of the embodiment.
Figure 4B:
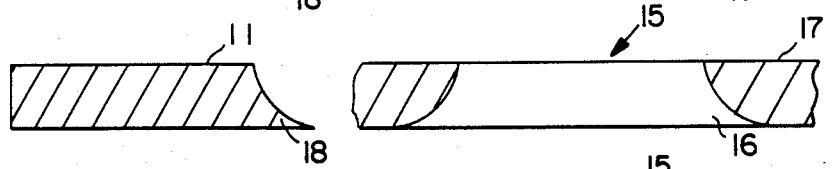
Figure 4C:
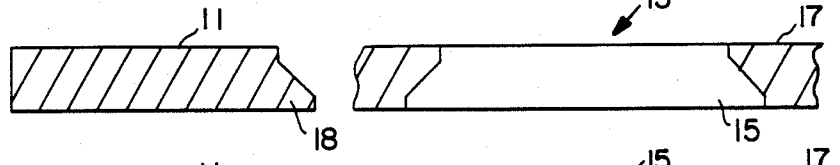
Figure 4D:
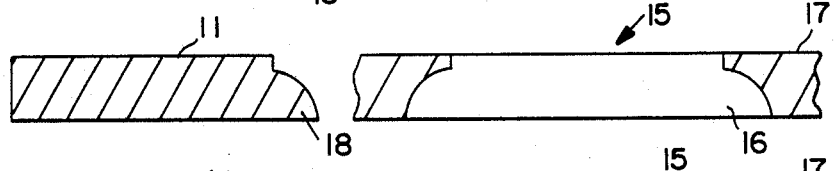
Figure 4E:
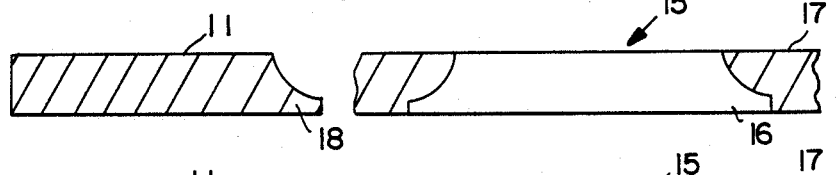
Figure 4F:
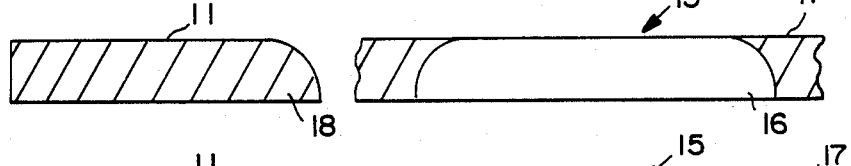
Figure 4G:
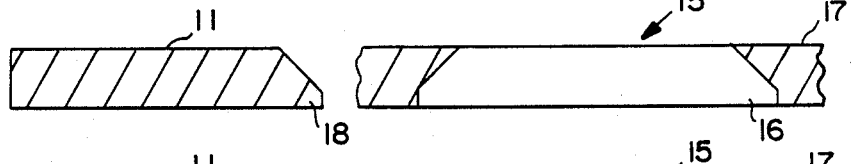
Figure 4H:
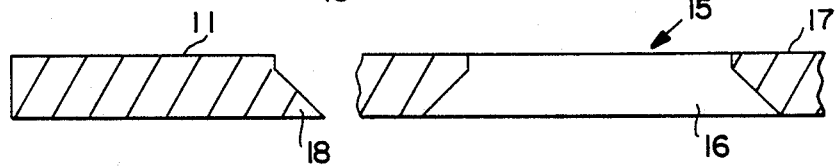

As shown at FIG. 4 the first and second element need not be restricted to the particular configuration shown at FIGS. 1, 2 and 3. The principal feature of the first element resides in the flange 18 which is formed to one side due to the outer face of the first element having a greater area than the inner face. The aperture 16 of the second element 15 has an opening corresponding in size to or slightly larger than the minimum area of the first element and is symmetrical in cross-section wherein the internal wall of the aperture has a cross-sectional configuration corresponding substantially to that of the edge of the second member in the region of the flange 18. Where the cross-sectional configuration of the internal wall of the aperture 16 and the flanged portion of the first element are not the same, the configuration should be such that there is positive engagement between the two with the minimum of free play.

It will be appreciated that the second element 15 may take the form of a plate as shown at FIG. 4 or a base with the aperture 16 machined into the upper surface of the base of limited depth depending on the thickness of the first element.

If desired the flange may be discontinuous to take the form of a series of lugs around the first element. Alternatively the flange may take the form of a single lug.

In addition the first and second element need not be of a circular configuration but may be of elliptical polygonal any other suitable shape.

It should be appreciated that the scope of the present invention need not be limited to the particular scope of the embodiment described above. In particular the invention need not be limited to the application described in relation to the embodiment and may be used in any situation where is desired to positively locate an item on a base to prevent accidental dislodgment of that item or tipping of that item.

Other applications of the invention may include means for lockably mounting items such as computers, calculators, typewriters, televisions, clothing irons, telephones and the like to a base. If such a mounting was used the item is positively held to the base but is readily removed and the item may be readily rotated on the base without any danger of the item being tipped over or dropped.

I claim:

1. An arrangement for detachable mounting a movable member to a base member for free rotation of said movable member relative to aid base member about a perpendicularly extending axis while preventing perpendicularly movement of said movable member relative to said base member in all rotated positions of said movable member, said mounting arrangement comprising a female element fixed relative to one of said members and have a continuous flange defining a continuous circular opening, around said perpendicularly expending axis and a male element fixed relative to the other of said members and having a first disk-like part complementary to and adapted to be received in said female element opening for supporting said members for relative rotation about the axis of said opening, said male element further having a second part eccentrically disposed relative to said first part and defining an eccentric flange adapted to underlie said continuous flange for detachable connecting said members together and preventing perpendicular movement of said male element relative to said female element, said eccentric flange of said male member and said circular opening of said female member being assembled and interlocked by sliding said eccentric flange and said circular opening transversely relative to each other until said eccentric flange underlies said female element and then moving said elements to bring first disk-like part of said male member into registry with said female element opening so that said eccentric flange interlocks with said female element.

2. An arrangement as set forth in claim 1 wherein the flanges are configured so that the movable member may be removed from the base member by lifting the side of the movable member disposed away from its associated flange in a vertical direction and then transversely moving the movable member relative to the base member for disassociating the members.

3. An arrangement as set forth in claim 2 wherein the movable member has a handle disposed diametrically opposite to its flange.

4. A mounting as claimed at claim 1 wherein said movable member comprises a cooking utensil such as a saucepan, pan or the like utensil and said base member comprises a heat source such as a stove top.

5. A mounting as claimed at claim 4 wherein the male element is mounted to the cooking utensil.

6. A mounting as claimed at claim 5 wherein the flange is located remote from the handle of the cooking utensil.

7. A mounting as claimed at claim 5 wherein the male element is integral with the base of the cooking utensil.

* * * * *